United States Patent
Qiu

(10) Patent No.: US 9,798,187 B2
(45) Date of Patent: Oct. 24, 2017

(54) BACKLIGHT MODULE AND LIQUID CRYSTAL DISPLAY HAVING THE SAME

(71) Applicant: Shenzhen China Star Optoelectronics Technology Co., Ltd., Guangdong (CN)

(72) Inventor: Yongyuan Qiu, Guangdong (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 105 days.

(21) Appl. No.: 14/905,172

(22) PCT Filed: Dec. 22, 2015

(86) PCT No.: PCT/CN2015/098266
§ 371 (c)(1),
(2) Date: Jan. 14, 2016

(87) PCT Pub. No.: WO2017/088222
PCT Pub. Date: Jun. 1, 2017

(65) Prior Publication Data
US 2017/0153498 A1    Jun. 1, 2017

(30) Foreign Application Priority Data
Nov. 27, 2015 (CN) .......................... 2015 1 0846856

(51) Int. Cl.
G02F 1/1335 (2006.01)
F21V 7/00 (2006.01)
F21V 7/06 (2006.01)

(52) U.S. Cl.
CPC ...... *G02F 1/133605* (2013.01); *F21V 7/0008* (2013.01); *F21V 7/06* (2013.01); *G02F 1/133603* (2013.01); *G02F 1/133608* (2013.01)

(58) Field of Classification Search
CPC ......... G02F 1/133605; G02F 1/133608; G02F 1/133615; G02B 6/0055; G02B 6/0031; F21V 7/06; F21V 7/0008; G09F 13/14
See application file for complete search history.

(56) References Cited

U.S. PATENT DOCUMENTS 7,972,046 B2 * 7/2011 Iwasaki ................ F21S 48/1159
362/517
8,523,389 B2 * 9/2013 Holten .................. F21V 7/0008
362/223

(Continued)

*Primary Examiner* — Michael H. Caley
*Assistant Examiner* — Jia Pan
(74) *Attorney, Agent, or Firm* — Brooks Kushman P.C.

(57) ABSTRACT

A backlight module, having: a light source, a first light reflection portion located above the light source, and a second light reflection portion located below the light source; the first light reflection portion includes a groove concaved towards the light source; an inner surface of the groove includes a first reflection parabolic surface and a second reflection parabolic surface interconnected with each other and having a focal point at the light source; the first reflection parabolic surface performs horizontal reflection on the light emitted from the light source; the second reflection parabolic surface reflects the light emitted from the light source to the second light reflection portion; the second light reflection portion performs horizontal reflection on the light reflected thereto. A liquid crystal display having the backlight module is also disclosed.

12 Claims, 2 Drawing Sheets

(56) References Cited

U.S. PATENT DOCUMENTS

| | | | | |
|---|---|---|---|---|
| 8,596,807 B2* | 12/2013 | Jeong | ................ | G02F 1/133615 |
| | | | | 362/97.1 |
| 8,622,597 B2* | 1/2014 | Tseng | .................. | F21S 48/1159 |
| | | | | 362/515 |
| 8,960,966 B2* | 2/2015 | Ko | ...................... | G02B 6/0046 |
| | | | | 362/298 |
| 2004/0114366 A1* | 6/2004 | Smith | ................... | F21S 48/328 |
| | | | | 362/247 |
| 2006/0087860 A1* | 4/2006 | Ishida | ................. | F21S 48/1159 |
| | | | | 362/517 |
| 2006/0109669 A1* | 5/2006 | Tanaka | ..................... | F21K 9/00 |
| | | | | 362/459 |
| 2006/0285341 A1* | 12/2006 | Yatsuda | .............. | F21S 48/1159 |
| | | | | 362/464 |
| 2007/0014126 A1* | 1/2007 | Kuo | .................... | G02B 6/0018 |
| | | | | 362/600 |
| 2012/0201040 A1* | 8/2012 | Naganawa | ........... | F21S 48/1104 |
| | | | | 362/487 |
| 2013/0027966 A1* | 1/2013 | Ko | ...................... | G02B 6/0031 |
| | | | | 362/602 |

* cited by examiner

BACKLIGHT MODULE AND LIQUID CRYSTAL DISPLAY HAVING THE SAME

CROSS-REFERENCE TO RELATED APPLICATION

This application is the U.S. national phase of PCT Application No. PCT/CN2015/098266 filed on Dec. 22, 2015, which claims priority to CN Patent Application No. 201510846856.5 filed on Nov. 27, 2015, the disclosures of which are incorporated in their entirety by reference herein.

TECHNICAL FIELD

The present invention relates to the display field, and more particularly, to a backlight module and a liquid crystal display having the same.

BACKGROUND ART

With the development of photoelectric and semiconductor technology, the flat panel display has been developed rapidly, and among various flat panel displays, the liquid crystal display (LCD) has become the mainstream of the market since it has many advantages, such as high space utilization efficiency, low power consumption, zero radiation and low electromagnetic interference.

The existed liquid crystal display mainly comprises a liquid crystal panel and a backlight module oppositely disposed. Since the liquid crystal panel itself is not luminous, it is necessary for the backlight module to provide the liquid crystal panel with a light source for display. According to the different light incident mode, the backlight module is mainly divided into the direct-type backlight module and the side-incident type backlight module.

In the direct-type backlight module, normally the LED should be collocated with a secondary optical lens; in the side-incident type backlight module, a light guide plate (LGP) having the light guide function is required. However, the secondary optical lens and the light guide plate occupy a larger proportion in direct-type backlight module and the side-incident type backlight module respectively, also, the secondary optical lens and the light guide plate are the main cause of the chromatic aberration. In addition, the direct-type backlight module is limited to the secondary optical lens, which can hardly achieve slim design.

Therefore, the prior art needs to be further improved and developed.

SUMMARY

In order to solve the problem existing in the prior art, the present invention aims to provide a backlight module, including: a light source, a first light reflection portion located above the light source, and a second light reflection portion located below the light source; the first light reflection portion comprises a groove concaved towards the light source; an inner surface of the groove comprises a first reflection parabolic surface and a second reflection parabolic surface interconnected with each other and having a focal point at the light source; the first reflection parabolic surface performs horizontal reflection on the light emitted from the light source; the second reflection parabolic surface reflects the light emitted from the light source to the second light reflection portion; the second light reflection portion performs horizontal reflection on the light reflected thereon.

Furthermore, the inner surface of the groove further comprises a third reflection parabolic surface having a focal point at the light source and connected to the first reflection parabolic surface; the third reflection parabolic surface reflects the light emitted from the light source to the second reflection parabolic surface; the second reflection parabolic surface reflects the light reflected by the third reflection parabolic surface thereon to the second light reflection portion; the second light reflection portion performs horizontal reflection or diffuse reflection on the light reflected thereon.

Further, the second light reflection portion comprises a bottom surface, a vertical surface extending perpendicularly upward from a side of the bottom surface, a first inclined surface extending obliquely upward from a side of the vertical surface, and a second inclined surface extending obliquely downward from a side of the first inclined surface; the first inclined surface is opposite to the light source; the the first inclined surface and the bottom surface form a acute angle; the second inclined surface and the bottom surface form an obtuse angle; wherein the first inclined surface and the second inclined surface are used to reflect the light horizontally.

Further, the second light reflection portion further comprises an uneven surface extending from a side of the second inclined surface, which is used to perform diffuse reflection on the light.

Furthermore, the first light reflection portion comprises: a first flat plate and a second flat plate provided parallel with each other, wherein the second flat plate is positioned above the first flat plate, and one end of the first flat plate is aligned with one end of the second flat plate, and the other end of the second flat plate goes beyond the other end of the first flat plate; a connecting member connecting the other end of the second flat plate and the other end of the first flat plate, wherein the connecting member has the groove concaved toward the light source.

Furthermore, the connecting member extends to connect one end of the first flat plate and one end of the second flat plate.

Furthermore, the third reflection parabolic surface, the first reflection parabolic surface and the second reflection parabolic surface are connected sequentially from the other end of the first flat plate to the other end of the second flat plate.

Furthermore, the backlight module also comprises a support portion; the support portion comprises a support plate, a vertical side plate perpendicularly extending vertically upward from a side of the support plate, and an inclined side plate extending obliquely upward from a side of the vertical side plate; wherein the other end of the first flat plate is connected to the vertical side plate, so that a connection portion between the third reflection parabolic surface and the other end of the first flat plate is positioned at a connection portion between the vertical side plate and the inclined side plate; the inclined side plate and the support plate form an acute angle; the light source is provided on the inclined side plate.

furthermore, the angle between the inclined side plate and the support plate is 45°.

The present invention also aims to provide a liquid crystal display comprising the above mentioned backlight module.

The advantageous effect of the present disclosure is as follows: compared with the direct-type backlight module in the prior art, the backlight module of the present invention does not need to use the secondary lens, hence the thickness thereof can be significantly reduced, thereby achieving slim design; also, compared with the side-incident type backlight module in the prior art, the backlight module of the present invention does not need to use the light guide plate, thereby significantly reducing the cost.

BRIEF DESCRIPTION OF THE DRAWINGS

These and/or other aspects, characteristics and advantages of the embodiments in the invention will become apparent and more readily appreciated from the following description, taken in conjunction with the accompanying drawings in which.

DETAILED DESCRIPTION OF EXEMPLARY EMBODIMENTS

Figure 1:
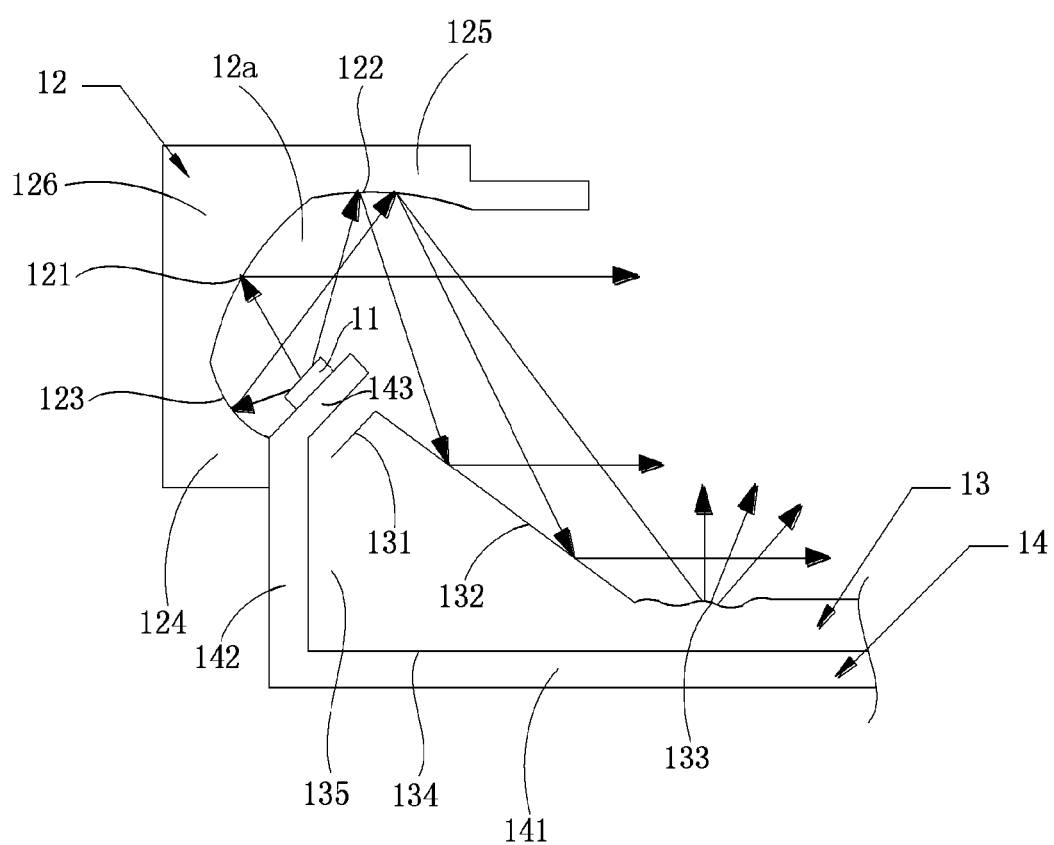
FIG. 1 is a partial structural view of the backlight module according to an embodiment of the present invention.

Embodiments of the present invention will be described in detail below by referring to the accompany drawings. However, the present invention can be implemented in numerous different forms, and the present invention may not be explained to be limited hereto. Instead, these embodiments are provided for explaining the principle and actual application of the present invention, thus other skilled in the art can understand various embodiments and amendments which are suitable for specific intended applications of the present invention.

In the drawing, the thicknesses of the layer and the region may be exaggerated so as to clarify the component, wherein the same reference sign may indicate the same component in the drawings.

It will be understood that, although the terms "first", "second" and "third" can be used to describe a variety of components, these components should not be limited by these terms. These terms are only used to separate one component from another.

FIG. 1 is a partial structural view of the backlight module according to an embodiment of the present invention.

Referring to FIG. 1, the backlight module 1 according to the embodiment of the present invention comprises: a light source 11, a first light reflection portion 12 and a second light reflection portion 13; wherein the first light reflection portion 12 is located above the light source 11, and the second light reflection portion 13 is located below the light source 11.

Specifically, the first light reflection portion 12 comprises: a groove 12a concaved towards the light source 11. An inner surface of the groove 12a comprises: a first reflection parabolic surface 121 and a second reflection parabolic surface 122 interconnected with each other and having focal point at the light source 11; wherein the first reflection parabolic surface 121 performs horizontal reflection on the light emitted from the light source 11 to the first reflection parabolic surface 121; the second reflection parabolic surface 122 reflects the light emitted from the light source 11 to the second light reflection portion 122 to the second light reflection portion 13. Here, the second light reflection portion 13 performs horizontal reflection on the light reflected by the second reflection parabolic surface 122 to the second light reflection portion 13; wherein the light reflected by the second reflection parabolic surface 122 to the second light reflection portion 13 is the light emitted directly from the light source 11 to the second reflection parabolic surface 122.

Further, the inner surface of the groove 12a further comprises: a third reflection parabolic surface 123 having a focal point at the light source 11; wherein the third reflection parabolic surface 123 is connected with the first reflection parabolic surface 121, that is, the first reflection parabolic surface 121 is located between the second reflection parabolic surface 122 and the third reflection parabolic surface 123, and the two ends of the first reflection parabolic surface 121 are connected with the second reflection parabolic surface 122 and the third reflection parabolic surface 123 respectively. The third reflection parabolic surface 123 reflects the light emitted from the light source 11 to the second light reflection portion 122, and the second reflection parabolic surface 122 reflects the light reflected by the third reflection parabolic surface 123 to the second reflection parabolic surface 122 to the second light reflection portion 13. Here, the second light reflection portion 13 performs horizontal reflection or diffusion reflection on the light reflected by the second reflection parabolic surface 122 to the second light reflection portion 13; wherein the light reflected by the second reflection parabolic surface 122 to the second light reflection portion 13 is the light emitted from the light source 11 to the third reflection parabolic surface 123 and reflected by the third reflection parabolic surface 123 to the second reflection parabolic surface 122.

In addition, in the present embodiment, the function of the light reflection can be realized by attaching or plating a metal reflective film on the inner surface of the groove 12a. Here, preferably, a silver reflective film is attached or plated, but the present invention is not limited thereto.

Figure 2:
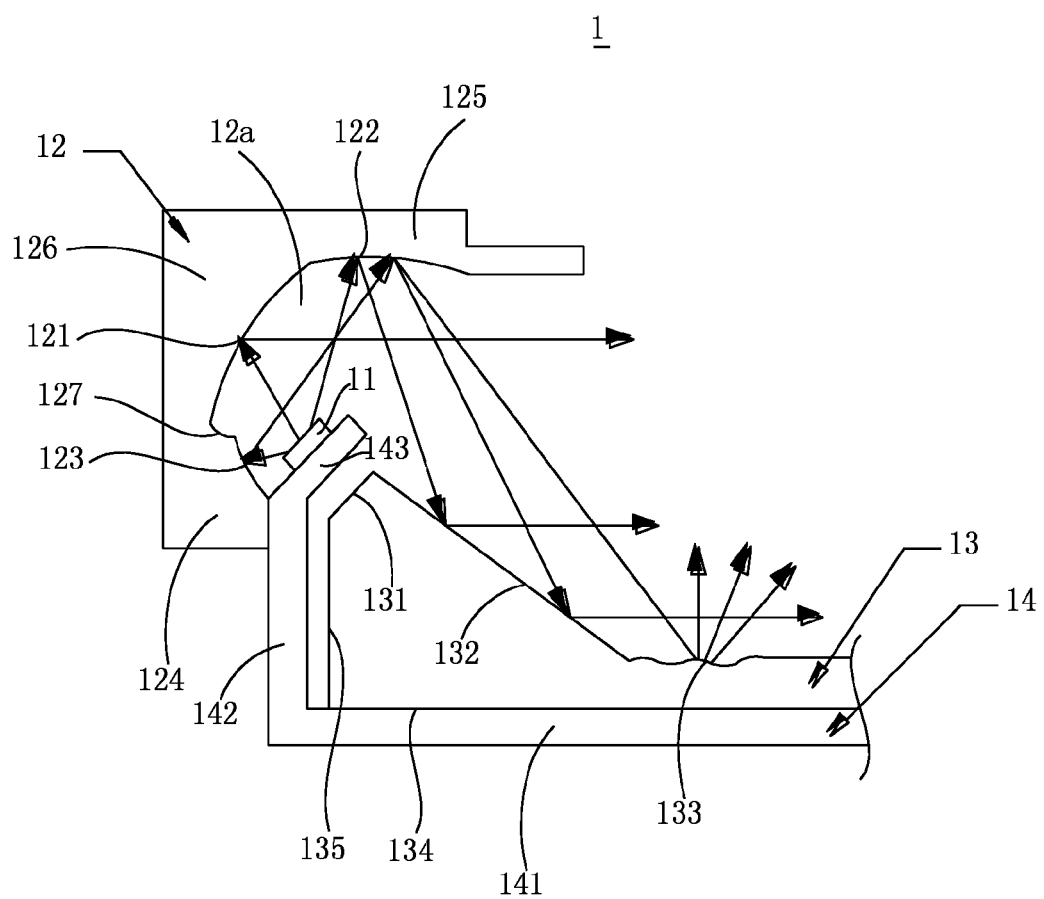
FIG. 2 is a partial structural view of the backlight module according to another embodiment of the present invention.

As another embodiment of the present invention, referring to FIG. 2, a transition surface 127 can be provided between the first reflection parabolic surface 121 and the third reflection parabolic surface 123, wherein the transition surface 127 is used to improve the light reflection effects of the first reflection parabolic surface 121 and the third reflection parabolic surface 123.

Hereinafter, the second light reflection portion 13 is further described with reference to FIG. 1.

Referring to FIG. 1, the second light reflection portion 13 comprises: a bottom surface (or a horizontal bottom surface) 134, a vertical surface 135 extending perpendicularly upward from a side (i.e. the free side) of the bottom surface 134, a first inclined surface 131 extending obliquely upward from a side (i.e. the free side) of the vertical surface 135, and a second inclined surface 132 extending obliquely downward from a side (i.e. the free side) of the first inclined surface 131; accordingly, the the first inclined surface 131 and the bottom surface 134 form a acute angle, while the second inclined surface 132 and the bottom surface 134 form an obtuse angle; wherein the second inclined surface 132 is used to reflect the light horizontally. Here the light reflected horizontally by the second inclined surface 132 includes: a light emitted directly from the light source 11 to the second reflection parabolic surface 122 and reflected by the second reflection parabolic surface 122 to the second inclined surface 132; a light emitted from the light source 11 to the third reflection parabolic surface 123 and reflected by the third reflection parabolic surface 123 to the second reflection parabolic surface 122, and reflected by the second reflection parabolic surface 122 to the second inclined surface 132.

Furthermore, the angle formed by the first inclined surface 131 and the bottom surface 134 is between 40° to 50°.

In the present embodiment, preferably, the angle between the first inclined surface 131 and the bottom surface 134 is 45°.

In addition, the second light reflection portion 13 further includes an uneven surface 133 extending from a side (i.e. the free side) of the second inclined surface 132; wherein, the uneven surface 133 is used to perform diffuse reflection on the light. Here the light reflected diffusedly by the uneven surface 133 includes: a light emitted from the light source 11 and reflected by the third reflection parabolic surface 123 to the second reflection parabolic surface 122, and reflected by the second reflection parabolic surface 122 to the second inclined surface 132.

In the present embodiment, the uneven surface 133 is a wave surface. However, the present invention is not limited thereto. For example, the uneven surface 133 can also be a curved surface.

The present embodiment may achieve the light reflection or light diffuse reflection function by attaching or plating metal reflective film on the second inclined surface 132, the uneven surface 133 and the other surfaces (not shown) extending from a side (i.e. the free side) of the uneven surface 133. Here, preferably, a silver reflective film is attached or plated, but the present invention is not limited thereto.

Here, a detailed description will be provided on the composition of the first light reflection portion 12 of the embodiment of the present invention.

Continually referring to FIG. 1, the first light reflection portion 12 comprises: a first flat plate 124 and a second flat plate 125 provided parallel with each other; wherein the second flat plate 125 is positioned above the first flat plate 124, one end of the first flat plate 124 is aligned with one end of the second flat plate 125, and the other end of the second plate 125 goes beyond the other end of the first plate 124; a connecting member 126 connecting the other end of the second flat plate 125 and the other end of the first flat plate 124; wherein the connecting member 126 comprises a groove 12*a* concaved towards the light source 11. Furthermore, the connecting member 126 extends to connect one end of the first flat plate 124 and one end of the second flat plate 125.

Accordingly, the third reflection parabolic surface 123, the first reflection parabolic surface 121 and the second reflection parabolic surface 122 are connected sequentially from the other end of the first plate 124 to the other end of the second plate 125.

Continually referring to FIG. 1, the backlight module 1 according to the embodiment of the present invention further comprises a support portion 14, wherein the support portion 14 comprises: a support plate 141 parallel with the bottom surface 134, a vertical side plate 142 extending vertically upward from a side (i.e. the free side) of the support plate 141, and an inclined side plate 143 extending obliquely upward from a side (i.e. the free side) of the vertical side plate 142; in this way, an angle between the inclined side plate 143 and the support plate 141 is an acute angle, and the light source 11 is provided on the inclined side plate 143. Preferably, the inclined side plate 143 is provided to be parallel with the first inclined surface 131.

In addition, in the present embodiment, the other end of the first plate 124 is connected to the vertical side plate 142, so that a connection portion of the third reflection parabolic surface 123 and the other end of the first plate 124 is aligned with a connection portion between the vertical side plate 142 and the inclined side plate 143; the present invention, however, is not limited thereto, for example, the connection portion of the third reflection parabolic surface 123 and the other end of the first plate 124 can be located above or below the connection portion between the vertical side plate 142 and the inclined side plate 143.

Furthermore, the angle formed by the inclined side plate 143 and the support plate 141 is between 40° and 50°. In the present embodiment, preferably, the angle between the inclined side plate 143 and the support plate 141 is 45°.

Figure 3:
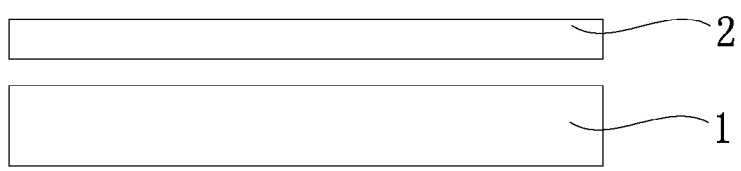
FIG. 3 is a partial structural view of the liquid crystal display according to an embodiment of the present invention.

FIG. 3 is a partial structural view of the liquid crystal display according to an embodiment of the present invention.

Referring to FIG. 3, the liquid crystal display according to the embodiment of the present invention comprises a backlight module 1 and a liquid crystal panel 2 disposed opposite to each other, wherein the backlight module 1 provides backlight to the liquid crystal panel 2 so as to allow the liquid crystal panel 2 to display an image.

Based on above, compared with the direct-type backlight module in the prior art, the backlight module according to the embodiment of the present invention does not need to use the secondary lens, hence the thickness thereof can be significantly reduced, thereby achieving slim design; also, compared with the side-incident type backlight module in the prior art, the backlight module according to the embodiment of the present invention does not need to use the light guide plate, thereby significantly reducing the cost.

Although the present invention is described with reference to the special exemplary embodiment, while those skilled in the art will understand: various changes in form and details may be made therein without departing from the spirit and scope of the invention as defined by the appended claims and its equivalents.

The invention claimed is:

1. A backlight module, comprising: a light source, a first light reflection portion located above the light source, and a second light reflection portion located below the light source;
    the first light reflection portion comprises a groove concaved toward the light source;
    an inner surface of the groove comprises a first reflection parabolic surface and a second reflection parabolic surface interconnected with each other and having a focal point which is the light source;
    the first reflection parabolic surface performs horizontal reflection on the light emitted from the light source, and the second reflection parabolic surface reflects the light emitted from the light source to the second light reflection portion;
    the second light reflection portion performs horizontal reflection on the light reflected thereto;
    wherein the inner surface of the groove further comprises a third reflection parabolic surface having a focal point which is the light source and connected with the first reflection parabolic surface;
    the third reflection parabolic surface reflects the light emitted from the light source to the second reflection parabolic surface; the second reflection parabolic surface reflects the light, which is reflected from the third reflection parabolic surface to the second reflection parabolic surface, to the second light reflection portion;
    the second light reflection portion performs horizontal reflection or diffuse reflection on the light reflected thereto.

2. The backlight module of claim 1, wherein the second light reflection portion comprises: a bottom surface, a vertical surface extending perpendicularly upward from a side of the bottom surface, a first inclined surface extending obliquely upward from a side of the vertical surface, and a second inclined surface extending obliquely downward from a side of the first inclined surface, an angle between the first inclined surface and the bottom surface is an acute angle, an angle between the second inclined surface and the bottom surface is an obtuse angle, and the second inclined surface is used to reflect the light horizontally.

3. The backlight module of claim 2, wherein the second light reflection portion comprises: an uneven surface extending from a side of the second inclined surface, which is used to perform diffuse reflection on the light.

4. The backlight module of claim 1, wherein the first light reflection portion comprises:
   a first flat plate and a second flat plate provided parallel with each other; wherein the second flat plate is positioned above the first flat plate, and one end of the first flat plate is aligned with one end of the second flat plate, and the other end of the second flat plate goes beyond the other end of the first flat plate;
   a connecting member connecting the other end of the second flat plate and the other end of the first flat plate; wherein the connecting member has the groove concaved toward the light source.

5. The backlight module of claim 4, wherein the connecting member extends to connect one end of the first flat plate and one end of the second flat plate.

6. The backlight module of claim 4, wherein the third reflection parabolic surface, the first reflection parabolic surface and the second reflection parabolic surface are connected sequentially from the other end of the first flat plate to the other end of the second flat plate.

7. The backlight module of claim 5, wherein the third reflection parabolic surface, the first reflection parabolic surface and the second reflection parabolic surface are connected sequentially from the other end of the first flat plate to the other end of the second flat plate.

8. The backlight module of claim 6, wherein the backlight module further comprises a support portion;
   the support portion comprises: a support plate, a vertical side plate extending vertically upward from a side of the support plate, and an inclined side plate extending obliquely upward from a side of the vertical side plate;
   the other end of the first flat plate is connected to the vertical side plate, so that a connection portion between the third reflection parabolic surface and the other end of the first flat plate is positioned at a connection portion between the vertical side plate and the inclined side plate;
   the inclined side plate and the support plate form an acute angle, and the light source is provided on the inclined side plate.

9. The backlight module of claim 7, wherein the backlight module further comprises a support portion;
the support portion comprises: a support plate, a vertical side plate extending perpendicularly upward from a side of the support plate, and an inclined side plate extending obliquely upward from a side of the vertical side plate;
the other end of the first flat plate is connected to the vertical side plate, so that a connection portion between the third reflection parabolic surface and the other end of the first flat plate is positioned at a connection portion between the vertical side plate and the inclined side plate;
the inclined side plate and the support plate form an acute angle, and the light source is provided on the inclined side plate.

10. The backlight module of claim 8, wherein an angle between the inclined side plate and the support plate is 45°.

11. The backlight module of claim 9, wherein an angle between the inclined side plate and the support plate is 45°.

12. A liquid crystal display, comprising a backlight module and a liquid crystal panel provided opposite to each other, wherein the backlight module comprises: a light source, a first light reflection portion located above the light source, and a second light reflection portion located below the light source;
the first light reflection portion comprises a groove concaved toward the light source;
an inner surface of the groove comprises a first reflection parabolic surface and a second reflection parabolic surface interconnected with each other and having a focal point which is the light source;
the first reflection parabolic surface performs horizontal reflection on the light emitted from the light source, and the second reflection parabolic surface reflects the light emitted from the light source to the second light reflection portion;
the second light reflection portion performs horizontal reflection on the light reflected thereto;
wherein the inner surface of the groove further comprises a third reflection parabolic surface having a focal point which is the light source and connected with the first reflection parabolic surface;
the third reflection parabolic surface reflects the light emitted from the light source to the second reflection parabolic surface; the second reflection parabolic surface reflects the light, which is reflected from the third reflection parabolic surface to the second reflection parabolic surface, to the second light reflection portion;
the second light reflection portion performs horizontal reflection or diffuse reflection on the light reflected thereto.

* * * * *